April 8, 1969

J. M. KEEFE 3,436,882

PIGEON CHASER

Original Filed Dec. 14, 1964

INVENTOR.
JOHN M. KEEFE
BY Moore, White & Burd
ATTORNEYS

United States Patent Office 3,436,882
Patented Apr. 8, 1969

3,436,882
PIGEON CHASER
John M. Keefe, 250 Midland Bank Bldg.,
Minneapolis, Minn. 55401
Continuation of application Ser. No. 418,072, Dec. 14, 1964. This application Aug. 8, 1967, Ser. No. 668,733
Int. Cl. E04b 1/72
U.S. Cl. 52—101        10 Claims

ABSTRACT OF THE DISCLOSURE

A mechanical bird frightening device having a plurality of movable elements rotatably mounted in spaced relationship on a flexible horizontal wire which is free to move and vibrate. Opposite ends of the wire are secured to supports. Each movable element has a flat body which reflects light and an U-shaped head section having a pair of spaced flanges with aligned holes for accommodating the wire whereby the body will swing and rotate in response to moving air and movement of the wire to produce a crackling and ringing noise as well as reflect light. Tubular plastic spacers freely rotate on the wire between adjacent elements function to maintain the spaces between the elements and prevent a bird from perching on the device.

*Cross-reference to related application*

This application is a continuation of application Ser. No. 418,072, filed Dec. 14, 1964, and now abandoned.

*Summary of invention*

This invention relates to a device for directing birds and animals away from a location and more particularly to a bird frightening device having a plurality of spaced movable elements for scaring birds by sound and visual means. The bird frightening device is an elongated scarecrow having a plurality of movable elements which reflect light and swing or rotate in response to moving air. The moving elements produce a crackling or ringing noise having the effect of scaring away birds. The elements are mounted on a flexible wire attached to a support. Tubular members on the wire space the movable elements from each other and prohibit birds from perching on the device. This prevents birds from becoming familiar with the device thereby deterring birds, as pigeons, from roosting on window ledges and the ornate structure of large commercial buildings. In addition, the bird frightening device is usable to direct the movement of creatures, such as birds and animals, by scaring them away from selected locations.

*In the drawings*

Figure 1:
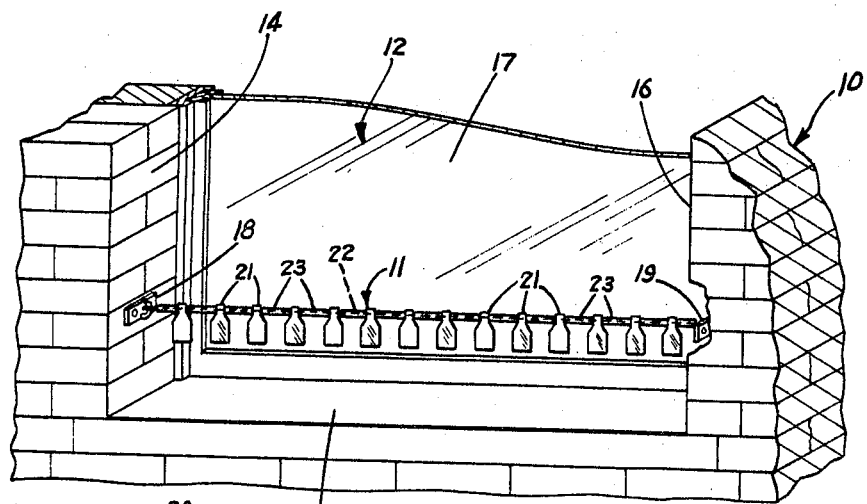
FIGURE 1 is a perspective view of one embodiment of the frightening device of this invention in assembled relation in a window of a building.

Referring to the drawing there is shown in FIGURE 1 a building 10 equipped with the bird frightening device of this invention indicated generally at 11. The building 10 shown in fragmentary section is a commercial structure such as a warehouse having a window opening 12 in the upright wall. The window opening 12 is defined by a substantially horizontal sill 13 joined with upright side walls 14 and 16. A glass pane 17 closes the window opening 12.

Buildings of this type are located in the commercial districts of urban areas and have become the habitat of large groups of common pigeons, starlings and other birds. These birds harbor on the window sills and ornate architecture of the buildings and subsist on food provided by the insanitary habits and the good-will of man. This large accumulation of birds is objectionable because their droppings deface and accelerate the deterioration of the buildings, automobiles and other property located in the area. It is a common occurrence that birds deposit droppings on unwary pedestrians. With reference to pigeons it has been found that pigeons droppings are a common contaminant of grain destined for use as human food.

In addition pigeon nests clog drain pipes, mar window sills, interfere with awnings, and render fire escapes hazardous. Many people consider pigeon noise irritating.

The bird frightening device 11 of this invention, functions as a bird scarecrow in that it deters the birds from using the building 10. As shown in FIGURE 1, the bird frightening device 11 extends linearly across the window opening 12 and is secured at its opposite ends to hook brackets 18 and 19 attached to the upright side walls 14 and 16. The brackets 18 and 19 together with the walls 14 and 16 are spaced upright supports for the bird frightening device 11. The device 11 has a plurality of linearly aligned movable elements 21 spaced above the window sill 13. The elements 21 are formed from lightweight corrosion-resistant metal strips such as aluminum or stainless steel. It is contemplated that the elements 21 desirably have light reflecting surfaces. The elements 21 may be formed from plastic material which desirably is reflective or is coated with a light reflecting paint or adhesive backed foil.

Each element 21 is freely mounted on a flexible support member 22 secured at its opposite ends to the brackets 18 and 19. The flexible support member 22 may be a cord, cable or wire, preferably a corrosion resistant copper wire. The elements 21 are maintained in a spaced linear relationship on the flexible support member 22 by spacers 23 operatively associated with the flexible support member 22.

Figures 2, 4:
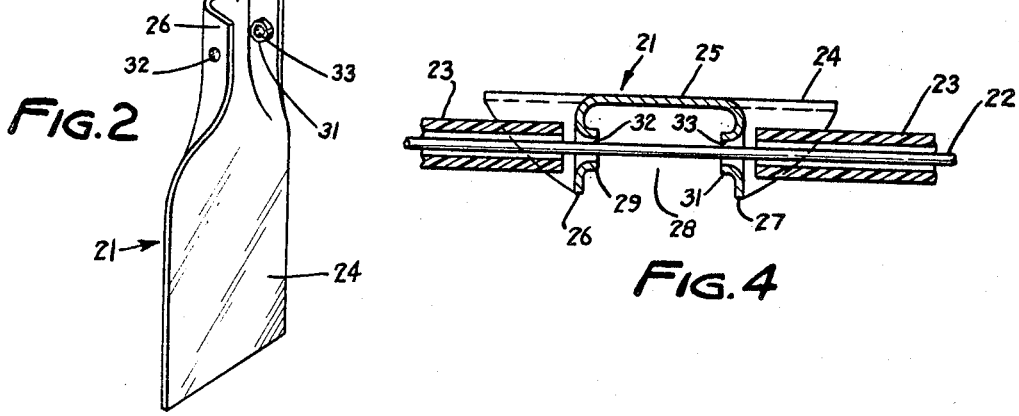
FIGURE 2 is an enlarged perspective view of one of the movable elements of the frightening devices of FIGURE 1.
FIGURE 4 is an enlarged sectional view taken along the line 4—4 of FIGURE 3.
Figure 3:
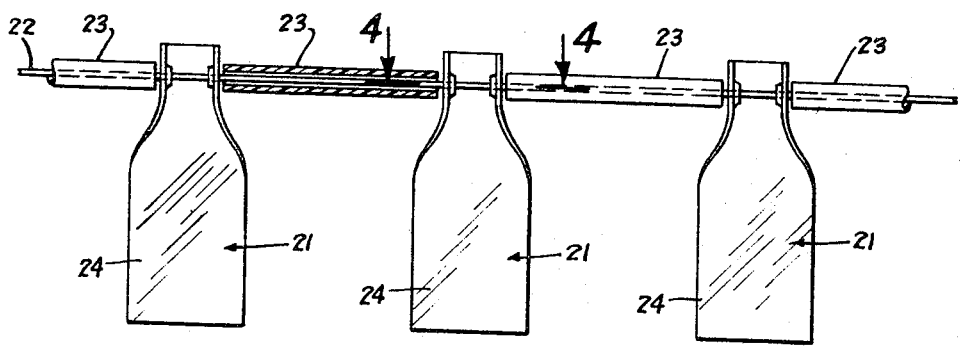
FIGURE 3 is an enlarged front view of a linear section of the frightening device of FIGURE 1.

In the embodiment shown in FIGURES 1 to 4 the spacers 23 comprise plastic tubular members interposed between adjacent movable elements 21 and surrounding the flexible member 22. As shown in FIGURE 3, the series of elements 21 and spacers 23 are loosely positioned on the wire 22 so as to permit independent and free swinging and rotating movement of the elements 21.

The specific construction of a movable element 21 is illustrated in FIGURES 2 and 4. The element 21 comprises a substantially flat rectangular-shaped body 24 integrally joined with a U-shaped head section 25. A pair of spaced flanges 26 and 27 form part of the head section 25 and project normally from the plane of the body 24. The head section 25 has a groove or channel 28, defined by the flanges 26 and 27, extended substantially parallel to the plane of the body 24.

As shown in FIGURE 4, the flanges 26 and 27 have a pair of bosses 29 and 31 projected towards each other into the groove 28. The bosses 29 and 31 extend from the inner surfaces of the mid-sections of the flanges 27 and 28 and have aligned holes 32 and 33. In the manufacture of the element 21 the flanges 26 and 27 and the bosses 29 and 31 together with the holes 32 and 33 may be formed by a bending and punching operation. To permit the free movement of the elements 21 upon the flexible support member 22 the holes 32 and 33 are considerably larger than the diameter of the flexible support member. This provides the elements 21 with limited universal movement on the flexible support member and intermittent contact with the flexible support member. These intermittent contacts on rotation or swinging of the elements 21 produce a crackling and ringing noise. This noise is intensified by having the ends of the spacers 23 positioned in a clearance relation with respect to the flanges 26 and 27 and by the flexible nature of the support member 22.

Figure 6:
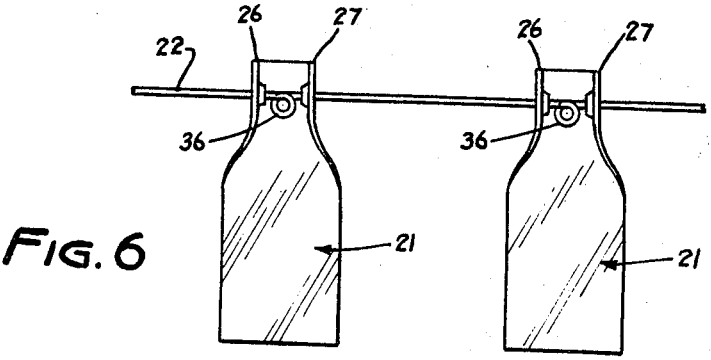
FIGURE 6 is a view similar to FIGURE 5 showing another modified spacer means for separating adjacent movable elements.
Figure 5:
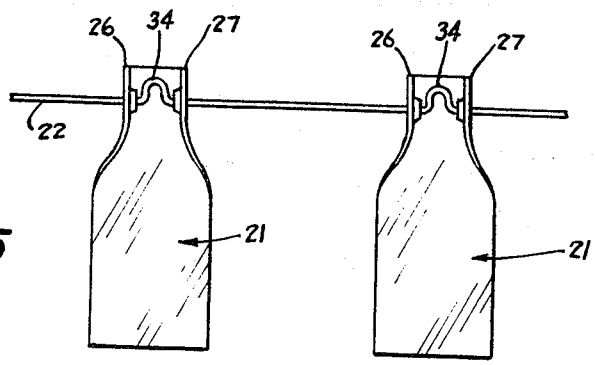
FIGURE 5 is a view similar to FIGURE 3 showing modified spacer means for separating adjacent movable elements.
Figure 7:
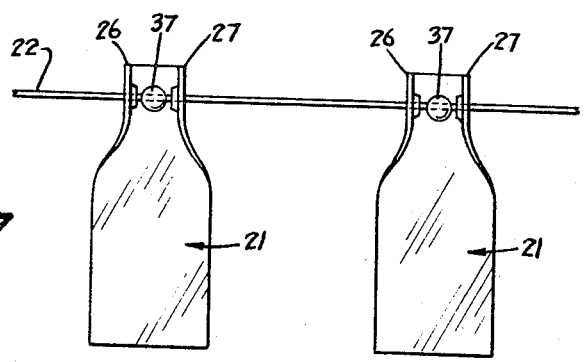
FIGURE 7 is a view similar to FIGURE 5 showing a further modification of the spacer means for sparating adjacent movable elements.

FIGURES 5, 6 and 7 show modified forms of spacers for maintaining the distance between adjacent movable elements 21. In the following description the elements which correspond to the bird frightening device 1 of FIGURES 1 to 4 have identical reference numbers. In FIGURE 5, the flexible support member 22 is bent at longitudinally spaced sections in the form of a U-shaped loop 34. The loop 34 is interposed between the flanges 26 and 27 of the movable element 21 thus limiting the linear movement of the element 21 along the flexible support member 22. The spacer shown in FIGURE 6 is similar to the loop 34 and comprises an E-shaped loop 36 placed in the flexible support member 22 at spaced intervals. The loop 36 is positioned between the flanges 26 and 27 of the element 21 and is alternately engageable with the inside surfaces of the flanges 26 and 27 to maintain the linear position of the element 21 on the flexible support member 22.

As shown in FIGURE 6, the spacers for the movable elements 21 comprises a plurality of beads 37 secured to the flexible support member 22. The beads 37 are spaced along the support member 22 and are interposed between the flanges 26 and 27 of each element 21. Beads 37 may be small amounts of solder or spot welds which increase the diameter of the flexible support member 22 thereby maintaining the relative spaced linear relationship of the elements 21 on the flexible support member 22.

In use, the device 11 is supported substantially parallel to a bird roosting surface such as the sill 13. The flexible support member 22 is positioned about 6 inches above the sill 13 and is attached at opposite ends to the brackets 18 and 19. The support member 22 independently mounts the movable element 21 in an aligned series with the body of each element positioned in an upright plane extended along and projected through the flexible member 22. Each of the movable elements 21 carried by the flexible support member 22 have fluttering movements caused by slight movement of air resulting in a crackling and ringing noise and reflecting in varying directions strong rays of light. This noise and reflected light have a terrifying and frightening effect on birds. The elements 21 carry out these movements even at a very slight air draft because they are freely mounted on the flexible support member 22. Since the flexible support member 22 is secured at its opposite ends it is free to continually vibrate and thus increase the degree of relative movement between the elements 21 and the flexible support member 22. This results in an increase in the intensity of the crackling and ringing noise which is offensive to birds, such as pigeons.

In summary, the bird frightening structure of this invention is a mechanical device which is used in combination with spaced supports. The bird frightening device 11 comprises a flexible support member 22 secured at opposite ends to the supports so as to be free to vibrate. A plurality of movable elements 21 are rotatably mounted in a spaced relationship linearly along the flexible support member 22. Spacer means are associated with the flexible support member 22 and with each of the movable elements 21. The spacer means functions to maintain the spaced relationship between adjacent elements 21 and thus prevents direct contact between the adjacent movable elements 21 so that each of the elements 21 functions independently to produce a crackling and ringing sound and to reflect light. All of the movable elements 21 produce a combined effect in response to moving air resulting in light reflections and sound generations which frighten and terrify birds. In other words, the device 11 functions to direct birds away from a location.

It is apparent that many modifications and variations of this invention as hereinbefore set forth may be made without departing from the spirit and scope thereof.

I claim:

1. In combination, a first support and a second support spaced from said first support, a flexible wire extended between and secured at opposite ends to said supports whereby the length of wire between the supports is free to move and vibrate, a plurality of elements freely mounted on said flexible wire, each of said elements having a body extended in the linear direction of the flexible wire and a head section at the upper end of the body including at least a pair of flanges projected substantially normal to said body in one direction, said flanges having aligned holes receiving the flexible wire thereby rotatably mounting the element on the flexible wire about an axis generally normal to the longitudinal axis of the body, and spacer means on said flexible wire engageable with said elements for maintaining a spaced relationship between adjacent elements, said spacer means comprising elongated tubular members freely rotable on the flexible wire between adjacent elements.

2. The combination defined in claim 1 wherein each of said elements has a substantially flat rectangular shaped body.

3. The combination defined in claim 1 wherein said tubular members comprise rigid plastic tubes freely rotatable on the wire adjacent elements.

4. The combination defined in claim 1 wherein each of said elements has a substantially flat rectangular shaped body and a U-shaped head section secured to one end of the body, said body and head section being formed from a single piece of aluminum metal.

5. In combination, a first upright support and a second upright support spaced from said first support, a substantially horizontal flexible wire extended between and secured at opposite ends to said support whereby the length of the wire between the supports is free to move and vibrate, a plurality of vertically depending elements freely mounted on said flexible wire, each of said elements having a flat body extended in the linear direction of the flexible wire and a head section at the upper end of the body, said head section including at least a pair of flanges projected substantially normal to the plane of said body in the same direction, said head section being narrower than the body, said flanges having aligned holes receiving the flexible wire thereby rotatably mounting the elements on the flexible wire for movement about an axis normal to the longitudinal axis of the body, and spacer means on the flexible wire engageable with adjacent elements for maintaining a spaced relationship between adjacent elements, said spacer means comprising elongated tubular members freely rotatable on the wire between adjacent elements.

6. The combination defined in claim 5 wherein said tubular members are rigid plastic tubes freely rotatable on the wire between adjacent elements.

7. The combination defined in claim 5 wherein said elements are one-piece aluminum members having a substantially flat rectangular shaped body and a U-shaped head integral with one end of the body.

8. In combination, a flexible wire adapted to be extended between and secured at opposite ends to supports whereby the wire is free to move and vibrate, a plurality of elements freely mounted on said flexible wire, each of said elements having a flat body extended in the linear direction of the flexible wire and a U-shaped head section at one end of the body, said head section having a pair of flanges projected substantially normal to the plane of said body in the same direction, said flanges having aligned holes for receiving the flexible wire thereby rotatably mounting the elements on the flexible wire for movement about an axis normal to the longitudinal axis of the body, and elongated tubular members freely rotatable on the wire between adjacent elements for maintaining a spaced relationship between adjacent elements.

9. The combination defined in claim 8 wherein said tubular members are rigid plastic tubes freely rotatable on the wire between adjacent elements.

10. The combination defined in claim 9 wherein said element are one-piece aluminum members.

References Cited

UNITED STATES PATENTS

| | | | |
|---|---|---|---|
| 511,700 | 12/1893 | Jacobs | 256—12 |
| 861,559 | 7/1907 | Trost | 256—12 |
| 2,485,148 | 10/1949 | Fralin | 52—101 |
| 2,728,154 | 12/1955 | Ross et al. | 46—53 X |
| 2,938,244 | 5/1960 | Christensen | 52—101 |
| 3,085,545 | 4/1963 | Ore | 40—39 X |
| 3,292,319 | 12/1966 | McCarthy | 52—101 |

FOREIGN PATENTS 476,266 1937 Great Britain.

FRANK L. ABBOTT, *Primary Examiner.*

PRICE C. FAW, Jr. *Assistant Examiner.*